(12) United States Patent
Singhal et al.

(10) Patent No.: US 10,922,120 B2
(45) Date of Patent: Feb. 16, 2021

(54) SYSTEM AND METHOD FOR GUIDED SYSTEM RESTORATION

(71) Applicant: EMC IP Holding Company LLC, Hopkinton, MA (US)

(72) Inventors: Upanshu Singhal, Bangalore (IN); Chakraveer Singh, Bangalore (IN); Archit Seth, Bangalore (IN); Shivakumar Kunnal Onkarappa, Bangalore (IN); Rahul Bhardwaj, Udaipur (IN); Chandra Prakash, Bangalore (IN); Akansha Purwar, Bangalore (IN); Lalita Dabburi, Bangalore (IN); Shilpa Mehta, Bangalore (IN); Manish Sharma, Bangalore (IN); Shelesh Chopra, Bangalore (IN); Kumari Priyanka, Bengaluru (IN); Navneet Upadhyay, Ghaziabad (IN); Asif Khan, Bangalore (IN); Pradeep Mittal, Karnal (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 230 days.

(21) Appl. No.: 16/047,791

(22) Filed: Jul. 27, 2018

(65) Prior Publication Data
US 2020/0034174 A1    Jan. 30, 2020

(51) Int. Cl.
*G06F 9/455* (2018.01)
*G06F 11/14* (2006.01)

(52) U.S. Cl.
CPC ...... *G06F 9/45558* (2013.01); *G06F 11/1451* (2013.01); *G06F 2009/45562* (2013.01); *G06F 2009/45579* (2013.01); *G06F 2009/45587* (2013.01); *G06F 2201/815* (2013.01)

(58) Field of Classification Search
None
See application file for complete search history.

(56) References Cited

U.S. PATENT DOCUMENTS

| 8,261,282 B1 * | 9/2012 | Ponnapur ................ G06F 9/505 718/1 |
| 2014/0149696 A1 * | 5/2014 | Frenkel ............... G06F 11/1469 711/162 |

* cited by examiner

*Primary Examiner* — Eric C Wai
(74) *Attorney, Agent, or Firm* — Chamberlain, Hrdlicka, White, Williams & Aughtry

(57) ABSTRACT

A method for managing virtual machines includes obtaining a restoration request via a first pane of a graphical user interface generated by a graphical user interface manager; in response to obtaining the restoration request: predicting a restoration load for performing the restoration of a virtual machine of the virtual machines; performing a resource availability analysis of the production hosts using the restoration load to obtain a list of production hosts for performing a restoration of the virtual machine; making a first determination that the list specifies at least one production host of the production hosts; and, in response to the first determination: modifying a second pane of the graphical user interface based on the list to obtain a modified second pane; obtaining a user selection of a restoration option displayed in the modified second pane; and restoring the virtual machine using the restoration option and backup/restoration policies.

16 Claims, 10 Drawing Sheets

SYSTEM AND METHOD FOR GUIDED SYSTEM RESTORATION

BACKGROUND

Computing devices may store information such as, for example, text documents, audio files, and databases. Such files may be stored on persistent storage such as hard disk drives, tape drives, solid state drives, etc.

Failure of a persistent storage may cause the information stored on the persistent storage to be lost. Over time information stored on persistent storage may be corrupted due to, for example, errant writes or deletions. Lost or corrupted data may prevent the information from being retrieved and used at later points in time.

SUMMARY

In one aspect, a remote agent for managing virtual machines in accordance with one or more embodiments of the invention includes a persistent storage, a graphical user interface manager, and a restoration manager. The persistent storage stores backup/restoration policies. The restoration manager is programmed to obtain a restoration request via a first pane of a graphical user interface generated by the graphical user interface manager. The restoration request is for a virtual machine of the virtual machines. The virtual machines are hosted by production hosts. In response to obtaining the restoration request, the restoration manager is programmed to predict a restoration load for performing the restoration of the virtual machine; perform a resource availability analysis of the production hosts using the restoration load to obtain a list of production hosts for performing a restoration of the virtual machine; make a first determination that the list specifies at least one production host of the production hosts; and, in response to the first determination: modify a second pane of the graphical user interface based on the list to obtain a modified second pane; obtain a user selection of a restoration option displayed in the modified second pane; and restore the virtual machine using the restoration option and the backup/restoration policies.

In one aspect, a method for managing virtual machines in accordance with one or more embodiments of the invention includes obtaining a restoration request via a first pane of a graphical user interface generated by a graphical user interface manager. The restoration request is for a virtual machine of the virtual machines. The virtual machines are hosted by production hosts. The method further includes, in response to obtaining the restoration request, predicting a restoration load for performing the restoration of the virtual machine; performing a resource availability analysis of the production hosts using the restoration load to obtain a list of production hosts for performing a restoration of the virtual machine; making a first determination that the list specifies at least one production host of the production hosts; and, in response to the first determination: modifying a second pane of the graphical user interface based on the list to obtain a modified second pane; obtaining a user selection of a restoration option displayed in the modified second pane; and restoring the virtual machine using the restoration option and backup/restoration policies.

In one aspect, a non-transitory computer readable medium in accordance with one or more embodiments of the invention includes computer readable program code, which when executed by a computer processor enables the computer processor to perform a method for managing virtual machines. The method includes obtaining a restoration request via a first pane of a graphical user interface generated by a graphical user interface manager. The restoration request is for a virtual machine of the virtual machines. The virtual machines are hosted by production hosts. The method further includes, in response to obtaining the restoration request, predicting a restoration load for performing the restoration of the virtual machine; performing a resource availability analysis of the production hosts using the restoration load to obtain a list of production hosts for performing a restoration of the virtual machine; making a first determination that the list specifies at least one production host of the production hosts; and, in response to the first determination: modifying a second pane of the graphical user interface based on the list to obtain a modified second pane; obtaining a user selection of a restoration option displayed in the modified second pane; and restoring the virtual machine using the restoration option and backup/restoration policies.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1:
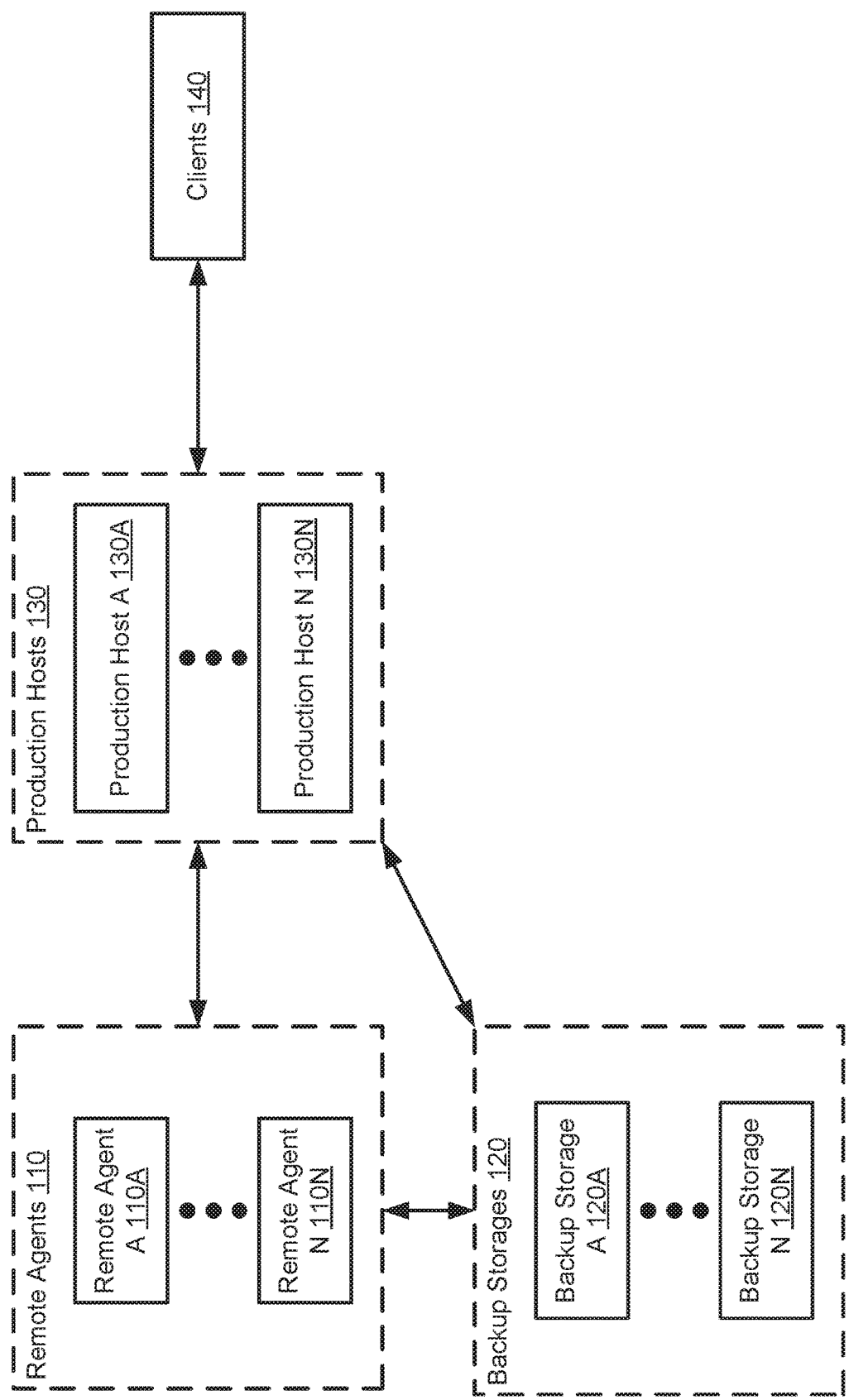
FIG. 1 shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for managing virtual machines in a distributed environment. By managing the virtual machines in accordance with embodiments of the invention, the uptime of the virtual machines may be improved when compared to contemporary methods.

In one or more embodiments of the invention, a system includes a number of production hosts that each host virtual machines. The system may further include a backup storage for storing backups of the virtual machines. The backups of the virtual machines may be used for restoration purposes. Restoring a virtual machine may return a virtual machine to a previous state, e.g., an operable state in the past or other type of known state. The system may store backups of other types of data and perform restorations of other types of data without departing from the invention.

In one or more embodiments of the invention, the system may manage the virtual machines by guiding users through restoration processes. Due to the complexity of modern distributed systems in which virtual entities may exist, it may not be possible for a user to accurately determine when and where a virtual machine may be restored. In other words, due to the number of independent actors in a distributed system the cognitive load placed on a user for invoking a restoration that will be successful may be unreasonable. Embodiments of the invention may provide a system for guiding a user that removes the complexity of performing a restoration of a virtual machine. By doing so, embodiments of the invention may reduce the cognitive burden on a user and provide an improved quality of virtual machine service by improving the uptime of the virtual machines.

In one or more embodiments of the invention, the system guides the user by automatically characterizing components of the distributed environment in which the virtual machines exist, selects viable locations for restoration of virtual machines based on the characterization, and guides the user to perform a restoration of the virtual machines in the viable locations. By doing so, embodiments of the invention may improve the uptime of virtual machines in a distributed environment and reduce the cognitive burden on a user. In contrast, contemporary methods that rely on user knowledge for selection of, for example, a restoration location for a virtual machine have reduced virtual machine uptime by virtue of the poor selection of restoration location.

FIG. 1 shows an example system in accordance with one or more embodiments of the invention. The system may include one or more remote agents (110) that manage production hosts (130). The remote agents 110) may manage the production hosts (130) by storing data from the production hosts in backup storage and/or orchestrate the restoration of data of the production hosts (130) using data stored in the backup storages (130). The system may further include clients (140) that interact with the production hosts (130). For example, the production hosts (130) may provide services to the clients (140). Each component of the system of FIG. 1 may be operably connected via any combination of wired and/or wireless connections. Each component of the system is discussed below.

In one or more embodiments of the invention, the remote agents (110) manage the production hosts (130). The remote agents (110) may manage the production hosts by storing data from the production hosts in the backup storages (120) and restoring production hosts (130) using data stored in the backup storages.

The remote agents (110) may orchestrate the storage of data by initiating the storage of the production host data at different point in time. The data may be, for example, a backup of data stored in the production hosts (130). The backup may be used by the production hosts (130) for restoration purposes. For example, the backup may be, for example, an image of a virtual machine executing on the production hosts, a difference disk of the virtual machine, or a log backup of an application executing on the virtual machine. The backup may be other types of backups without departing from the invention.

The remote agents (110) may before workflows for storing data from the production hosts (130) based on backup/restoration policies. Backup/restoration policies may specify the steps of storing data from the production hosts (130) and the steps of restoring data of the production hosts (130). For additional details regarding backup/restoration policies, See FIG. 2B.

The remote agents (110) may orchestrate the restoration of data of the production hosts (130) by providing a guided restoration. As will be discussed in greater detail below, the process of performing a restoration of production host data may be complicated due to the number of options available for performing a restoration. In addition, because of the distributed nature of the environment of FIG. 1 a user attempting to initiate a restoration of production host data may not be able to identify the relevant parameters that lead to the success or failure of the restoration. By providing a guided restoration, embodiments of the invention may improve the likelihood of a restoration initiated by a user being successful.

In one or more embodiments of the invention, the remote agents (110) provide a guided restoration by characterizing the distributed environment in which the production hosts (130) operate and limit the available options presented to a user during the guided restoration based on the characterization. By doing so, a user may be prevented from selecting options that would otherwise cause the restoration to: (i) fail, (ii) take longer than the users it to take, and/or (iii) reduce a quality of services provided to the clients (140) by the production hosts (130) during the restoration.

In one or more embodiments of the invention, the remote agents (110) provide the guided restoration by monitoring the computing resources of the production hosts (130). For example, the remote agents (110) may monitor the available, total, and/or used processing resources, memory resources, storage resources, and/or network bandwidth of the production hosts (130). The monitoring may be over time at a granular level, e.g., monitored at fifteen minute intervals or other intervals. The monitoring may be stored and, as will be discussed below, used to generate predictions.

In one or more embodiments of the invention, the remote agents (110) provide the guided restoration by removing options for performing the restoration based on the monitoring of the resources. For example, the remote agents (110)

may remove locations for performing restoration, e.g., certain production hosts, the time for performing the restoration, and/or the type of restoration that can be performed from graphical user interfaces presented to users. By doing so, the remote agents (110) may provide an improved restoration service in a distributed environment by identifying and taking action based on characteristics of the distributed environment that the user would otherwise not take into account when initiating a restoration. These features of embodiments of the invention reduce a cognitive burden on a user during the process of restoration and improve the reliability of performing restorations within the distributed environment. In contrast, contemporary methods of performing restoration place an overwhelming cognitive burden on users and lead to the likely failure of restorations.

To provide the guided restorations, the remote agents (110) display graphical user interfaces to users. The graphical user interfaces may include available options for performing a restoration. As a user selects options from the graphical user interface, the remote agents (110) may automatically remove a portion of the options. For example, a first pane of a graphical user interface may enable the user to identify the data of the production host to be restored. Based on the identified data, the remote agents (110) may modify one or more options in a second pane of the graphical user interface. The modification of the one or more options may be remove or otherwise prevent the user from selecting the modified one or more options. For additional details regarding restorations, See FIG. 2A. For additional details regarding the graphical user interfaces, See FIGS. 3A-3B.

In one or more embodiments of the invention, the remote agents (110) perform restorations of production host data based on input received from user via the graphical user interfaces. As noted above, the graphical user interface may be dynamically modified by the remote agents (110) in response to user input received via the graphical user interfaces and/or changes in the distributed system, e.g., changes in computing resources of components of the system.

In one or more embodiments of the invention, the remote agents (110A, 110N) are implemented as computing devices. A computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the backup agent (120) described throughout this application and/or all, or a portion thereof, of the methods illustrated in FIGS. 4A-4B. For additional details regarding computing devices, See FIG. 6.

In one or more embodiments of the invention, the remote agents (110) are implemented as logical devices. A logical device may utilize the computing resources of any number of computing devices and thereby provide the functionality of the remote agents (110) described throughout this application and/or all, or a portion thereof, of the methods illustrated in FIGS. 4A-4B. For additional details regarding the remote agents (110), See FIG. 2A.

In one or more embodiments of the invention, the backup storages (120) store data form the production hosts (130). The data may be, for example, backups of data stored in the production hosts (130). Additionally, the backup storages (120) may provide data in response to requests from the remote agents (110) and/or the production hosts (130). For example, during restoration workflows performed by the remote agents (110), the remote agents (110) may request that data from the backup storages (120) be transmitted to one or more of the production hosts (130).

In one or more embodiments of the invention, the backup storages (120) are implemented as computing devices. A computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the backup storages (120) described throughout this application and/or all or a portion of the methods illustrated in FIGS. 4A-4B. For additional details regarding computing devices, See FIG. 6.

In one or more embodiments of the invention, the backup storages (120A, 120N) are implemented as logical devices. A logical device may utilize the computing resources of any number of computing devices and thereby provide the functionality of the backup storage (120A, 120N) described throughout this application and/or all or portion of the methods illustrated in FIGS. 4A-4B.

In one or more embodiments of the invention, the production hosts (130) interact with the clients (140). Interacting with the clients (140) may cause the production hosts (130) to generate data that is important to the clients (140) or other entities. For example, the production hosts (130) may host virtual machines and/or applications that provide services to the clients (140). The services may be, for example, database, email, file storage, or any other type of service. Interactions with the clients (140) may cause the virtual machines or applications hosted by the production hosts (130) to store the data that is important to the clients (140) or other entities.

As noted above, the remote agents (110) may manage the production hosts (130) by storing backups and performing restorations for the production hosts (130). By doing so, embodiments of the invention may improve the reliability of the important data stored in the production hosts (130). In other words, failures of the production hosts (130) may be remediated by utilizing the previously stored data from the production hosts (130). In this manner, clients (140) may rely on the important data store in the production hosts (130) being available in the future.

In one or more embodiments of the invention, the production hosts (130) are implemented as computing devices. A computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the production hosts (130) described throughout this application and/or all or a portion of the methods illustrated in FIG. 4A-4B. For additional details regarding computing devices, See FIG. 6.

In one or more embodiments of the invention, the production hosts (130) are implemented as logical devices. A logical device may utilize the computing resources of any number of computing devices and thereby provide the functionality of the production host (130). For additional details regarding the production hosts (130), See FIG. 2A.

In one or more embodiments of the invention, the clients (140) utilize services hosted by the production hosts (130). As discussed above, for example, the clients (140) may interact with applications hosted by virtual machines hosted by the production hosts (130).

Additionally, the clients (140) may initiate restorations of production hosts (130), virtual machines hosted by the production hosts (130), or applications hosted by the virtual machines. In such a scenario, a graphical user interface may be displayed to users of the clients (140) and thereby enable the user to select options for performing the restorations. Thus, embodiments of the invention may provide a guided restoration that prevents users from initiating restorations that are likely to not meet goals of the user. For example, a user may desire for a virtual machine to be restored within 30 minutes. The user may provide such criteria via the user interface. In response to the criteria, one or more options for performing the restoration of the virtual machine may be removed from the graphical user interface because a prediction based on a characterization of the distributed environment, e.g., a resource availability analysis, indicates that it is unlikely that the virtual machine would be restored in 30 minutes if any of the now removed option for performing the restoration were selected.

In one or more embodiments of the invention, the clients (140) are implemented as computing devices. A computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the clients (140) described throughout this application and/or all or a portion of the methods illustrated in FIGS. 4A-4B. For additional details regarding computing devices, See FIG. 6.

In one or more embodiments of the invention, the clients (140) are implemented as logical devices. A logical device may utilize the computing resources of any number of computing devices and thereby provide the functionality of the clients (140) described throughout this application.

While the system of FIG. 1 has been illustrated as including a limited number of components for the sake of brevity, the system may include additional components (not shown), fewer components, and/or different components (not shown) without departing from the invention.

Figure 2A:
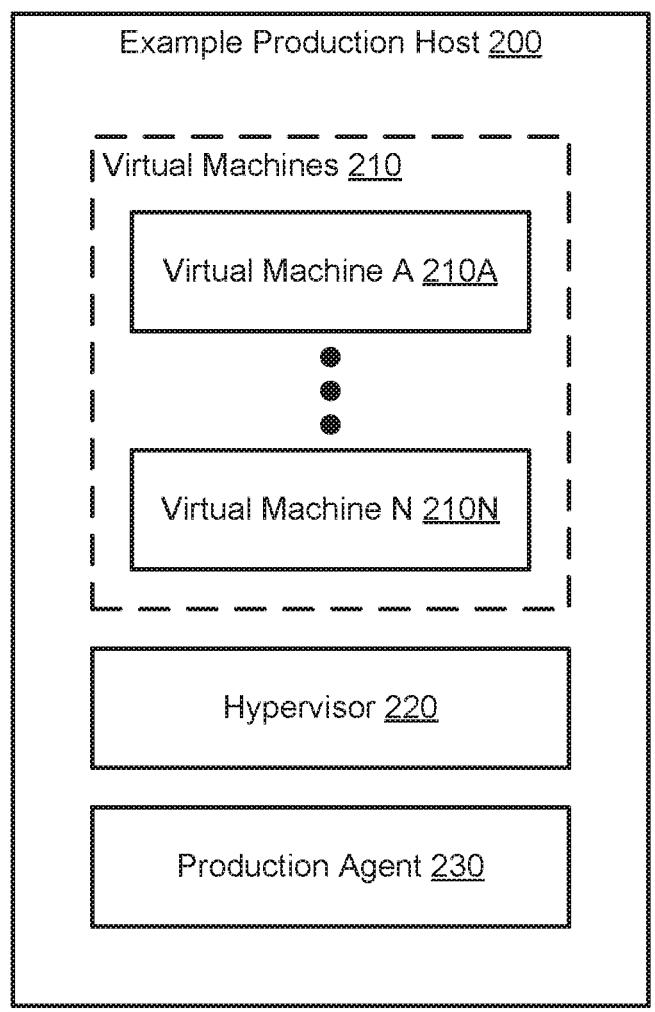
FIG. 2A shows a diagram of an example production host in accordance with one or more embodiments of the invention.

As discussed above, the backup storages may store data obtained from the production hosts (130). FIG. 2A shows a diagram of an example production host (200) in accordance with one or more embodiments of the invention. The example production host (200) may be similar to the production hosts (130) discussed above.

In one or more embodiments of the invention, the example production host (200) hosts virtual machines (210). Additionally, the example production host (200) may include a hypervisor (220) that orchestrates the operation of the virtual machines (210) and a production agent (230) that manages the storage of data, e.g., virtual machine images, in backup storage and/or restorations of data based on other data stored in backup storage. Each portion of the example production host (200) is discussed below.

In one or more embodiments of the invention, the virtual machines (210) are logical entities executed using computing resources of the example production host (200) and/or other computing devices. The virtual machines (210) may be performing similar or different processes. In one or more embodiments of the invention, the virtual machines (210) provide services to clients (e.g. 140, FIG. 1). For example, the virtual machines (210) may host instances of databases, email servers, and/or other applications. The virtual machines (210) may host other types of applications without departing from the invention.

In one or more embodiments of the invention, clients interact with the virtual machines (210) and thereby cause the virtual machines (210) to generate data that is relevant and/or important to the client. To ensure that such data is available in the future, the production agent (230) may backup the data and/or perform restorations of the data independently or under the direction of a remote agent and/or other entities.

For example, the production agent (230) may send images of the virtual machines and/or other data structure to the backup storage for storage. Similarly, the production agent (230) may restore a virtual machine using the previously stored data structures.

Figure 4A:
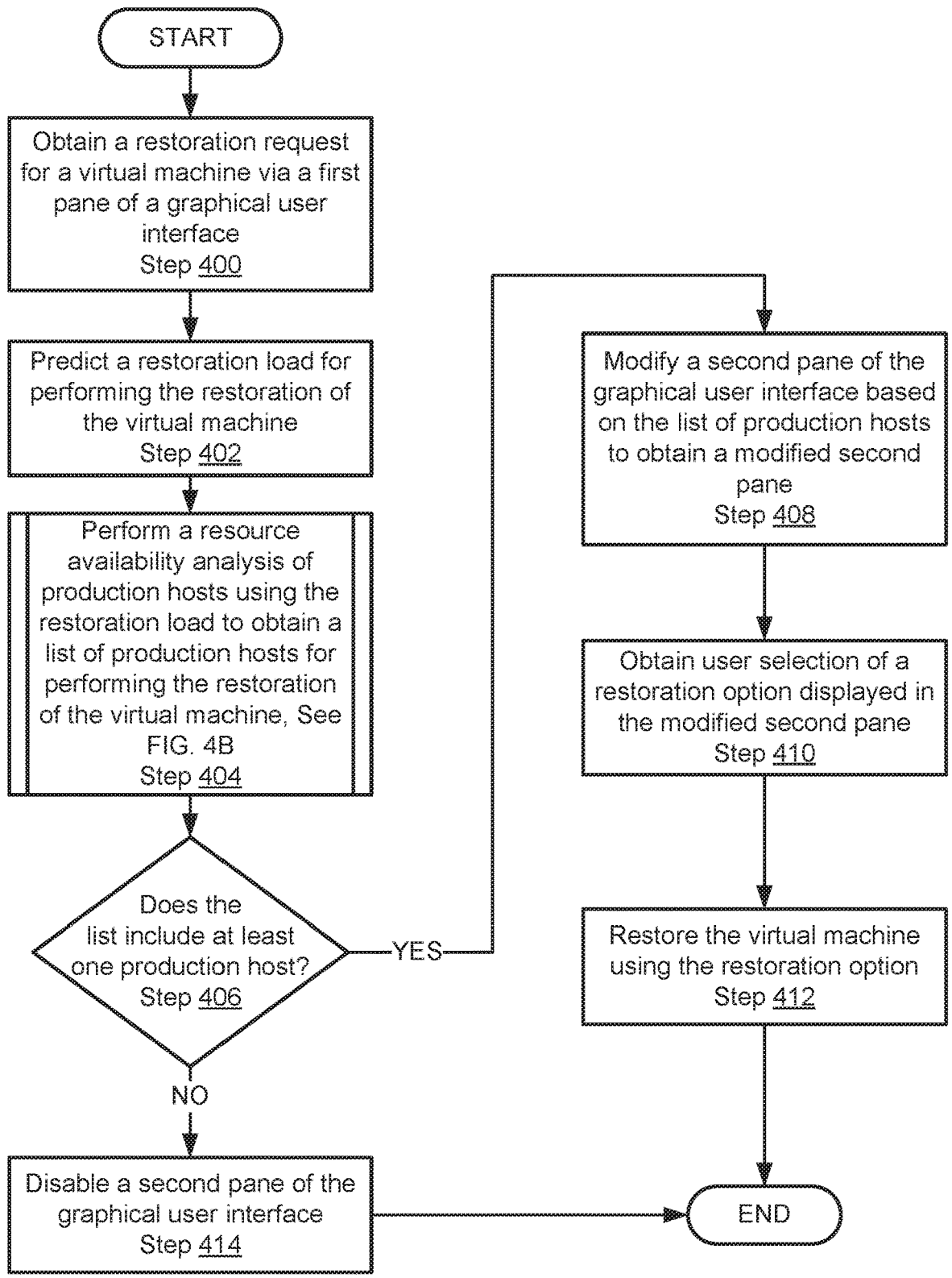
FIG. 4A shows a flowchart of a method of managing virtual machines in accordance with one or more embodiments of the invention.
Figure 4B:
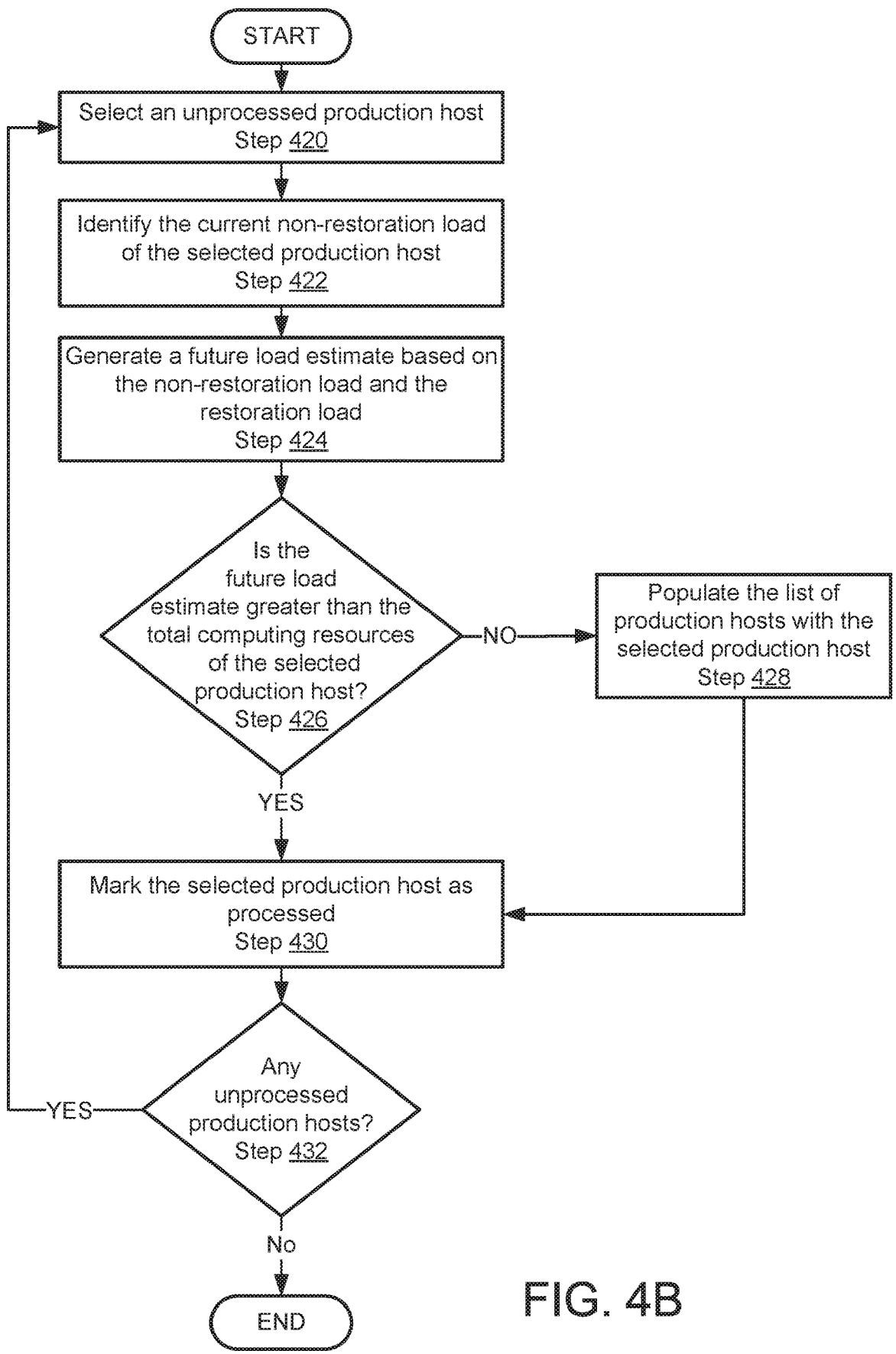
FIG. 4B shows a flowchart of a method of performing a resource availability analysis in accordance with one or more embodiments of the invention.

In one or more of embodiments of the invention, the virtual machines (210) are implemented as computer instructions, e.g., computer code, stored on a persistent storage that when executed by a processor of the example production host (200) cause the example production host (200) to provide the functionality of the virtual machines (210) described throughout the application and/or all or a portion of the methods illustrated in FIGS. 4A-4B.

In one or more embodiments of the invention, the hypervisor (220) orchestrates the operation of the virtual machines (210). The hypervisor (220) may orchestrate the operation of the virtual machines (210) by allocating computing resources to each virtual machine (210).

In one or more embodiments of the invention, the hypervisor (220) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the hypervisor (220) described throughout this application and/or all or a portion of the methods illustrated in FIGS. 4A-4B.

In one or more of embodiments of the invention, the hypervisor (220) is implemented as computer instructions, e.g., computer code, stored on a persistent storage that when executed by a processor of the example production host (200) causes the example host computing host (200) to provide the functionality of the hypervisor (220) described throughout the application and/or all or a portion of the methods illustrated in FIGS. 4A-4B.

In one or more embodiments of the invention, the production agent (230) manages the storage and/or restoration of data on the example production host (200). The production agents (230) may be controlled remotely by another entity such as, for example, a remote agent. In this manner, the entity may orchestrate the storage and/or restoration of data.

The data may be, for example, backups of virtual machines. The production agent (230) may issue commands to the hypervisor (220) to control the operation of the virtual machine (210) when a backup of a virtual machine (210) and/or a restoration of the virtual machine (210) is performed.

In one or more embodiments of the invention, the production agent (230) is a hardened entity, i.e., not modifiable by an entity that is remote to the example production host (200) on which the production agent (230) is executing. The production agent (230) may have a set, finite number of predefined functions that may be invoked by remote entities. In one or more embodiments of the invention, the production agent (230) is not configurable by modifying settings or associated configuration files of the production agent (230) by a remote entity.

In one or more embodiments of the invention, the local backup agent (230) is implemented as computer instructions, e.g., computer code, stored on a persistent storage that when executed by a processor of the example production host (200) causes the example production host (200) to provide the functionality of the production agent (230) described throughout the application and/or all or a portion of the methods illustrated in FIGS. 4A-4B.

In one or more embodiments of the invention, the production agent (230) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the production agent (230) described throughout this application and/or all or a portion of the methods illustrated in FIGS. 4A-4B.

Figure 2B:
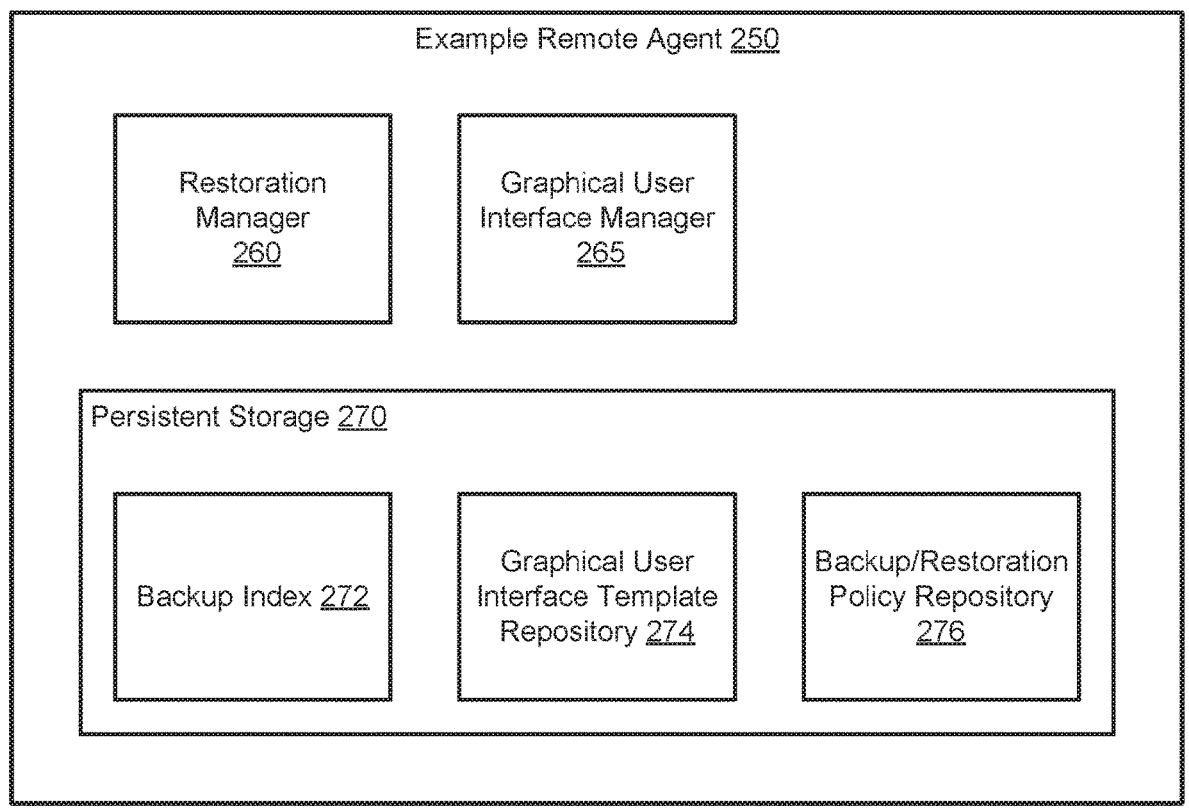
FIG. 2B shows a diagram of an example remote agent in accordance with one or more embodiments of the invention.

As noted above, remote agents may orchestrate the storage and restoration of production host data. FIG. 2B shows a diagram of an example remote agent (250) in accordance with one or more embodiments of the invention. The example remote agent (250) may be similar to a remote agent (110A, 110N, FIG. 1) discussed above.

As discussed above, the example remote agent (250) may manage production hosts by storing production host data and restoring production host data. Restoring production host data may return it to a previous state, e.g., restoring a virtual machine executing on a production host to a previous state using a previously stored image of the virtual machine in backup storage. When performing a restoration, the example remote agent (250) may guide a user in a manner that results in a restoration workflow that meets the users expectations in terms of time to perform the restoration, ensures that the restoration is likely to complete, and prevents the restoration from negatively impacting the services provided to clients or other entities.

To provide the aforementioned functionality, the example remote agent (250) may include a restoration manager (260), a graphical user interface manager (265), and persistent storage (270). The persistent storage (270) may store data structures utilized by the restoration manager (260) and the graphical user interface manager (265). Each component of the example remote agent (250) is discussed below.

In one or more embodiments of the invention, the restoration manager (260) manages the restoration of data of the production hosts. For example, the restoration manager (260) may manager the process of restoring virtual machines hosted by the production hosts. The restoration manager (260) may manage the restoration of virtual machines by performing a guided restoration process. To provide a guided restoration process, the restoration manager (260) may perform all or a portion of the methods illustrated in FIGS. 4A-4B. Additionally, the restoration manager (260) may invoke the functionality of the graphical user interface manager (265) to perform a guided restoration.

In one or more embodiments of the invention, a guided restoration proactively limits the options for performing a restoration presented to a user based on one or more of: (i) the predicted computing resource cost of performing the backup, (ii) the available computing resources of the production hosts or other entities over time, (iii) predicted availabilities of the computing resources of the production hosts or other entities over time, (iv) the network condition between the backup storage storing backups that will be used in the restoration and the production hosts, (v) the services currently and in the future that will be provided by the production hosts to the clients, and (vi) restoration policies that specify the restoration workflow for the data. The options for performing the restoration may include one or more of: (a) locations for performing a backup merge (where multiple backups are integrated together into a data structure that represents a state of data at a desired point in time in the past), (b) locations for instantiating the data (where the data will reside once merged, could be different than merge location, e.g., a different device), and (c) available times for performing the restoration. The options for performing the restoration may include additional and/or different options without departing from the invention.

In one or more embodiments of the invention, the restoration manager (260) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the restoration manager (260) described throughout this application and/or all or a portion of the methods illustrated in FIGS. 4A-4B.

In one or more embodiments of the invention, the restoration manager (260) is implemented as computer instructions (e.g. computer code) stored on a persistent storage that when executed by a processor of the example remote agent (250) cause the example remote agent (250) to provide the functionality of the restoration manager (260) described throughout this application and/or all or a portion of the methods illustrated in FIGS. 4A-4B.

In one or more embodiments of the invention, the graphic user interface manager manages graphical user interfaces that are displayed to users. The graphical user interfaces may be interactive, i.e., enable users to provide information. The graphical user interface manager (265) may manage the graphical user interfaces by generating displaying panes, obtaining user input, and modifying panes based on the user input. For example, the graphical user interface manager (265) may generate graphical user interfaces when invoked by the restoration manager (260) and provide information from users obtained via the graphical user interfaces to the restoration manager. The graphical user interface manager (265) may use templates from the graphical user interface template repository (274) of the persistent storage (270) to generate and display graphical user interfaces.

In one or more embodiments of the invention, the graphical user interface manager (265) includes functionality to display graphical user interfaces to remote users, e.g., users of clients or other computing devices. By doing so, user need not be local to the example remote agent (250) to select restoration options of a guided restoration. For additional details regarding graphical user interfaces, See FIGS. 3B-3C.

In one or more embodiments of the invention, the graphical user interface manager (265) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the graphical user interface manager (265) described throughout this application and/or all or a portion of the methods illustrated in FIGS. 4A-4B.

In one or more embodiments of the invention, the graphical user interface manager (265) is implemented as computer instructions (e.g. computer code) stored on a persistent storage that when executed by a processor of the example remote agent (200) cause the example remote agent (200) to provide the functionality of the graphical user interface manager (265) described throughout this application and/or all or a portion of the methods illustrated in FIGS. 4A-4B.

As discussed above, the restoration manager (260) and the graphical user interface manager (265) may use data structures stored in the persistent storage (270) to perform their respective functionalities. In one or more embodiments of the invention, the persistent storage (270) stores data structures and may be, for example, hard disk drives, solid state drives, tape drives, or any combination thereof. The persistent storage (270) may be other types of digital storage without departing from the invention. The persistent storage (270) may be a virtualized storage without departing from the invention.

The persistent storage (270) may store a backup index (272), a graphical user interface repository (274), and a backup/restoration policy repository (274). The persistent storage (270) may include additional, fewer, and/or different data structures without departing from the invention. Each of the aforementioned data structures is discussed below.

The backup index (272) may be a data structure that specifies data, e.g., backups of virtual machines, stored in backup storage. The data specified by the backup index (272) may be used by the restoration manager (260) when performing a restoration of data of a production host to a predetermined state. For example, when performing a restoration of a virtual machine, multiple backups corresponding to the state of the virtual machine at different points in time and across time may be needed to perform a restoration of the virtual machine. The backup index (272) may include a listing of such backups in backup storage and thereby enable the example remote agent (250) to identify the backups necessary for performing a restoration without interrogating the backup storage. For additional details regarding the backup index (272), See FIG. 3A.

The graphical user interface template repository (274) may be a data structure that includes templates that may specify characteristics of graphical user interfaces. For example, the characteristics may be the layout, fields, and widgets of panes of the user interface. The templates may be used by the graphical user interface manager (265) to generate appropriate graphical user interfaces dynamically when the restoration manager (260) is performing a guided restoration. The graphical user interface template repository may include templates for other types of graphical user interfaces without departing from the invention.

The backup/restoration policy repository (276) may be a data structure that specifies workflows for performing backups of data from the production hosts and workflows for performing restorations of production host data. The aforementioned workflows may specify the steps for performing the backups and restorations. The restoration manager (260) may utilize these policies to estimate a computing resource cost of performing a restoration. The policies of the backup/restoration policy repository may be used for other purposes without departing from the invention.

The backup/restoration policy repository (276) may specify workflows for performing backups that specify when, where, and how the backups are performed. The backup/restoration policy repository (276) may specify workflows for performing restorations that specify when, where, and how the backups are performed. Additionally, the graphical user interface manager (265) may utilize the workflows specified by the restoration policies to populate portions of a graphical user interface during a guided restoration.

Figure 3A:
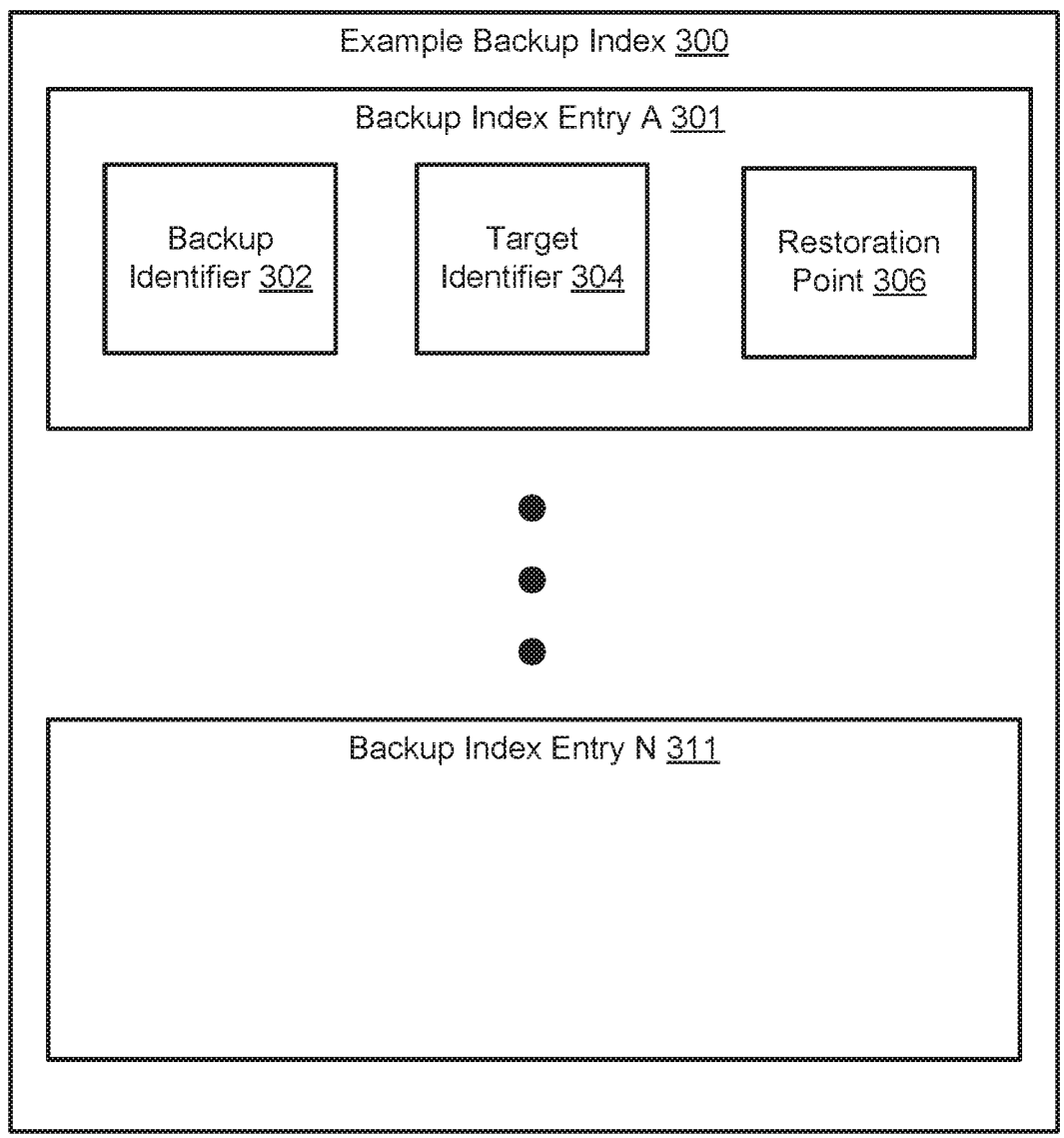
FIG. 3A shows a diagram of an example backup index in accordance with one or more embodiments of the invention.

As discussed above, a restoration manager may use a backup index for performing restorations. FIG. 3A shows a diagram of an example backup index (300) in accordance with one or more embodiments of the invention. The example backup index (300) may include one or more backup index entries (301, 311) corresponding to respective backups stored in backup storages (e.g., 120, FIG. 1). Each entry (301, 311) may include a backup identifier (302), a target identifier (304), and a restoration point (306). Each portion of the example backup index (300) is discussed below.

In one or more embodiments of the invention, the backup identifier (302) identifies the backup of the respective backup index entry (301, 311). The backup identifier (302) may be, for example, a file name. The backup identifier may be other types of identifiers without departing from the invention.

In one or more embodiments of the invention, the target identifier (304) specifies an entity of the system of FIG. 1 associated with the backup identified by the backup identifier (302). In other words, the entity for which the backup was generated. The backup identified by the backup identifier (302) may be used to restore the entity identified by the target identifier (306). The target identifier (304) may be, for example, a uniform resource identifier (URI) that discriminates the entity specified by the target identifier (304) from all other entities of the system of FIG. 1. The target identifier (304) may be other types of identifiers without departing from the invention.

In one or more embodiments of the invention, the restoration point (306) specifies a point or time period associated with the backup identified by the backup identifier (302). For example, the restoration point (306) may be a point in time in which the backup was generated. In such a scenario, the backup associated with the entry may be usable, in isolation, to perform a restoration, to that point in time, of data in a production host. Additionally, the aforementioned backup may be used in conjunction with other backups for performing restoration. For example, multiple backups the form a continuous chain over a period of time may be used to perform a restoration of data over the continuous chain of time.

Figure 3B:
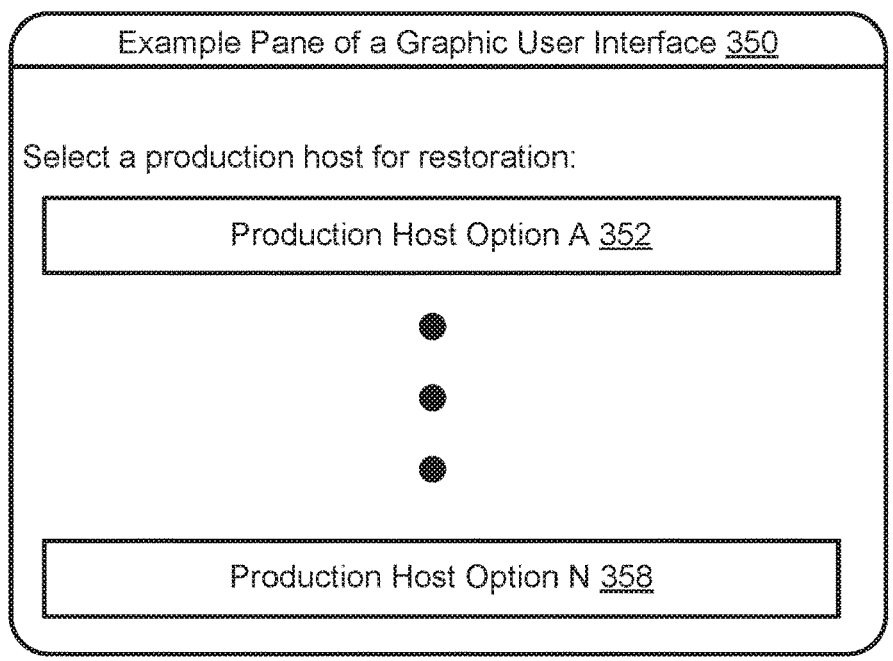
FIG. 3B shows a diagram of an example pane of a graphical user interface in accordance with one or more embodiments of the invention.

As discussed above, remote agents may generate graphical user interfaces when performing a guided restoration of a virtual machine. These graphical user interfaces may include panes that are displayed to a user. FIG. 3B shows a diagram of an example pane of a graphical user interface (350) in accordance with one or more embodiments of the invention. The example pane (350) may include fields for a user to enter information or select options. For example, in FIG. 3B the example pane of the graphical user interface (350) includes a number of production host options (352, 358) that may be selected by a user. In this manner, the graphical user interface may be used to display information to a user and obtain input from a user.

Figure 3C:
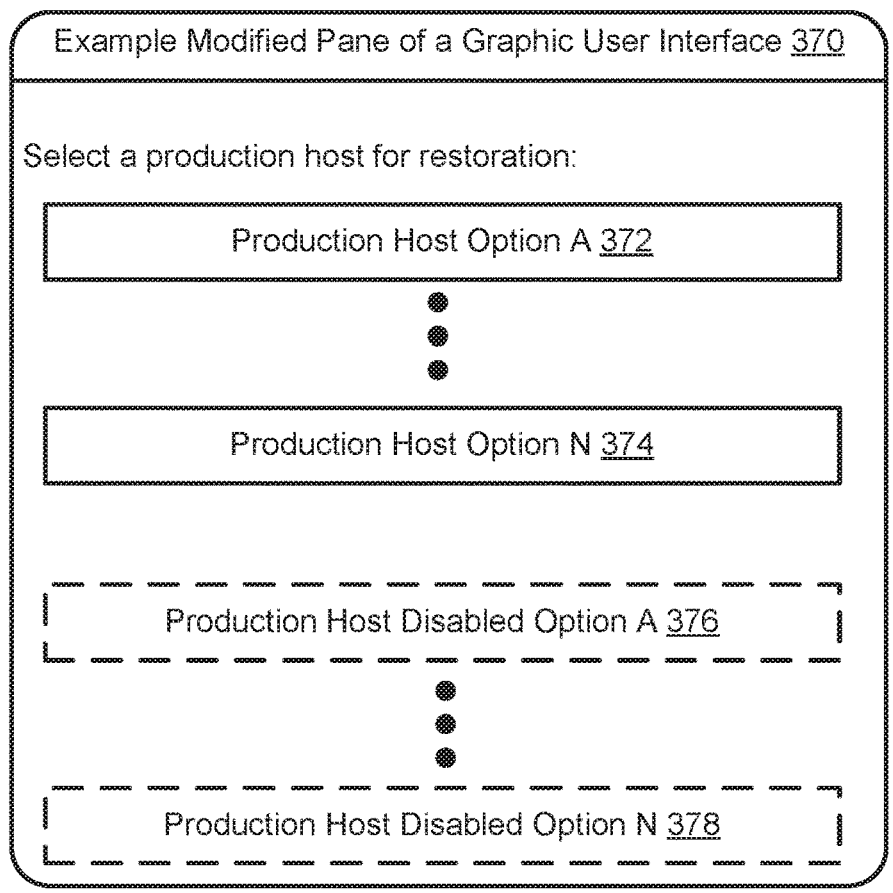
FIG. 3C shows a diagram of the example pane of FIG. 3B after it is modified in accordance with one or more embodiments of the invention.

As discussed above, when a guided restoration is performed the remote agent may remove some options for performing a restoration based on input received from a user. FIG. 3C shows a diagram of an example modified pane of the graphical user interface (350) that shows a potential modification in response to user data. Consider, for example, a scenario in which a user requests that a restoration be performed within 15 minutes. Due to computing resources, bandwidth, or other limitations of production hosts, only a certain number of the production hosts may be able to perform the restoration within 15 minutes. In such a scenario, the remote agent may disable a first portion of options, e.g., production host disabled option A (376) and production host disabled option N (378), while keeping a second portion of options, e.g., production host option A (372) and production host option N (374), enabled for user selection. By doing so the system may prevent a user from invoking a process for performing a restoration that would not be able to meet the user's expectations, would not be accomplishable, or would cause user experiences of the clients to suffer.

In FIG. 3C, the dashed lines indicate that the options are not selectable. For example, the dashed boxes may not be selectable via a mouse click, touch input from a touch sensitive display, or other user input device.

While specific examples of graphical user interfaces and modifications thereof are illustrated in FIGS. 3B-3C, embodiments of the invention are not limited to the aforementioned examples. A graphical user interface in accordance with embodiments of the invention may include any number of input fields and display any type/amount of information without departing from the invention. A modified graphical user interface in accordance with embodiments of the invention may have a reduced set of options for performing a restoration, the reduction of which is based at least in part on user input obtained via the graphical user interface.

As discussed above, remote agents may perform methods for managing virtual machines. FIG. 4A shows a flowchart of a method in accordance with one or more embodiments of the invention. The method depicted in FIG. 4A may be used to manage virtual machines in accordance with one or more embodiments of the invention. The method shown in FIG. 4A may be performed by, for example, a remote agent (110, FIG. 1). Other components of the system illustrated in FIG. 1 may perform the method of FIG. 4A without departing from the invention.

In Step 400, a restoration request for a virtual machine is obtained via a first pane of a graphical user interface.

In one or more embodiments of the invention, the first pane, generated by the graphical user interface manager of the remote agent, displays to a user options for restoration of a virtual machine. The user may use the first pane to select a virtual machine for restoration. The selection of a virtual machine may prompt the computing device displaying the first pane to send a restoration request for the virtual machine to the remote agent.

In Step 402, a restoration load is predicted for performing the restoration of the virtual machine.

In one or more embodiments of the invention, the restoration load is predicted based on the number of backups required for performing the restoration. As noted above, in some scenarios it may be required to use multiple backups for performing a restoration. In such a scenario, computing resources are consumed when merging the multiple backups. A backup index may be used to identify the number of backups required for performing the restoration.

In one or more embodiments of the invention, the restoration load is predicted based on size of each of the number of backups. As the size of the backups increases, the computing resources and network bandwidth required for performing the restoration may increase.

In Step 404, a resource availability analysis of production hosts is performed using the restoration load as predicted in Step 402 to obtain a list of production hosts for performing the restoration of the virtual machine.

In one or more embodiments of the invention, the resource availability analysis is performed by monitoring computing resources of the production hosts and comparing the monitoring to the restoration load as predicted in Step 402.

In one or more embodiments of the invention, the resource availability analysis is performed using the method illustrated in FIG. 4B. The resource availability analysis may be performed via other methods without departing from the invention.

In Step 406, it is determined whether there is at least one production host in the list of Step 404. If there is a production host in the list, the method may proceed to Step 408. If there is not a production host on the list, the method may proceed to Step 414.

In Step 408, a second pane of the graphical user interface is modified based on the list of production hosts to obtain a modified second pane.

In one or more embodiments of the invention, the second pane is modified by the graphical user interface manager of the remote agent. The graphical user interface manager may use the list of production hosts to modify the options displayed to a user. The options may correspond to production hosts included in the list. The second pane may be modified to disable options for production hosts previously on the second pane that are not on the list of production hosts. For example, the options may be disabled by removing the ability for the user to select the disabled options. By doing so, the options presented to the user are automatically reduced and, consequently, reduce the cognitive load on the user for invoking a restoration.

In one or more embodiments of the invention, the second pane is modified to change the point in time during which a restoration may be performed. For example, some options presented to a user for performing a restoration may be disable in the second pane. By doing so, the options presented to the user are automatically reduced and, consequently, reduce the cognitive load on the user for invoking a restoration.

The second pane of the graphical user interface may be modified in different ways without departing from the invention. For example, different portions of the second pane may be color coded to indicate the relative risk of performing a restoration using the aforementioned options. In another example, the options may be reordered to present those options that are likely to be more successful first and options that are less likely to be successful second. In a further example, all but a single option may be disabled that the remote agent has identified as being the best option.

In Step 410, a user selection of a restoration option displayed in the modified second pane is obtained.

In one or more embodiments of the invention, the user selects a production host from the available options displayed on the modified second pane. The restoration option may be selected by the user using the modified second pane. The computing device displaying the second pane of the graphical user interface may send the user selection to the remote agent orchestrating the restoration of the virtual machine.

In Step 412, the virtual machine is restored using the restoration option.

In one or more embodiments of the invention, the restoration option specifies the production that will host the restored virtual machine. In response to obtaining the user selection of the restoration option, the remote agent may prompt the selected production host to perform the restoration of the virtual machine.

The method may end following Step 412.

Returning to Step 406, the method may proceed to Step 414 if the list does not include at least one production host.

In Step 414, a second pane of the graphical user interface is disabled.

In one or more embodiments of the invention, the second pane is disabled by preventing the second pane from being displayed or otherwise interacted with by a user. Because there are no production hosts on the list as determined in Step 406, no production hosts are displayed as being available to perform the restoration of the virtual machine.

The method may end following Step 414.

FIG. 4B shows a flowchart of a method in accordance with one or more embodiments of the invention. The method depicted in FIG. 4B may be used to perform a resource availability analysis in accordance with one or more embodiments of the invention. The method shown in FIG. 4B may be performed by, for example, remote agents (110, FIG. 1). Other components of the system illustrated in FIG. 1 may perform the method of FIG. 4B without departing from the invention.

In Step 420, an unprocessed production host is selected.

In one or more embodiments of the invention, the production host is selected from the production hosts illustrated in FIG. 1. Prior to Step 420, all production hosts may be unprocessed.

In Step 422, a current non-restoration load of the selected production host is identified.

In one or more embodiments of the invention, the non-restoration load is identified by monitoring computing resources of the selected production host. Monitoring the computing resources may include, for example, tracking the amount of data stored in the selected production host, tracking an average amount of computing processing performed during a predetermined period of time, and/or tracking memory (i.e. random access memory) usage during the predetermined period of time.

In Step 424, a future load estimate is generated based on the non-restoration load and the restoration load.

In one or more embodiments of the invention, the future load is generated by aggregating the current non-restoration load and the predicted restoration load (e.g., Step 402, FIG. 4A). The non-restoration load and restoration load may be aggregated by, for example, summing the values of the non-restoration load and the restoration load. The future load may be estimated using other methods without departing from the invention. For example, the non-restoration load and restoration load may be weighted, e.g., increased or decreased in value by a factor, and summed. In other embodiments of the invention, the future load estimate may be generated based on the predicted restoration load and the averaged non-restoration load over a predetermined period of time.

In Step 426, it is determined whether the future load estimate is greater than the total computing resources of the selected production host. If the future load estimate is not greater than the total computing resources of the selected production host, the method may proceed to Step 428. If the future load estimate is greater than the total computing resources of the selected production host, the method may proceed to Step 430.

In Step 428, the list of production hosts is populated with the selected production host. For example, an identifier of the selected production host may be added to the list to populate the list.

In Step 430, the selected production host is marked as processed.

In Step 432, it is determined whether there are any unprocessed production hosts. If there are any unprocessed hosts, the method may proceed to Step 420. If there are no unprocessed production hosts, the method may end following Step 432.

Figure 5A:
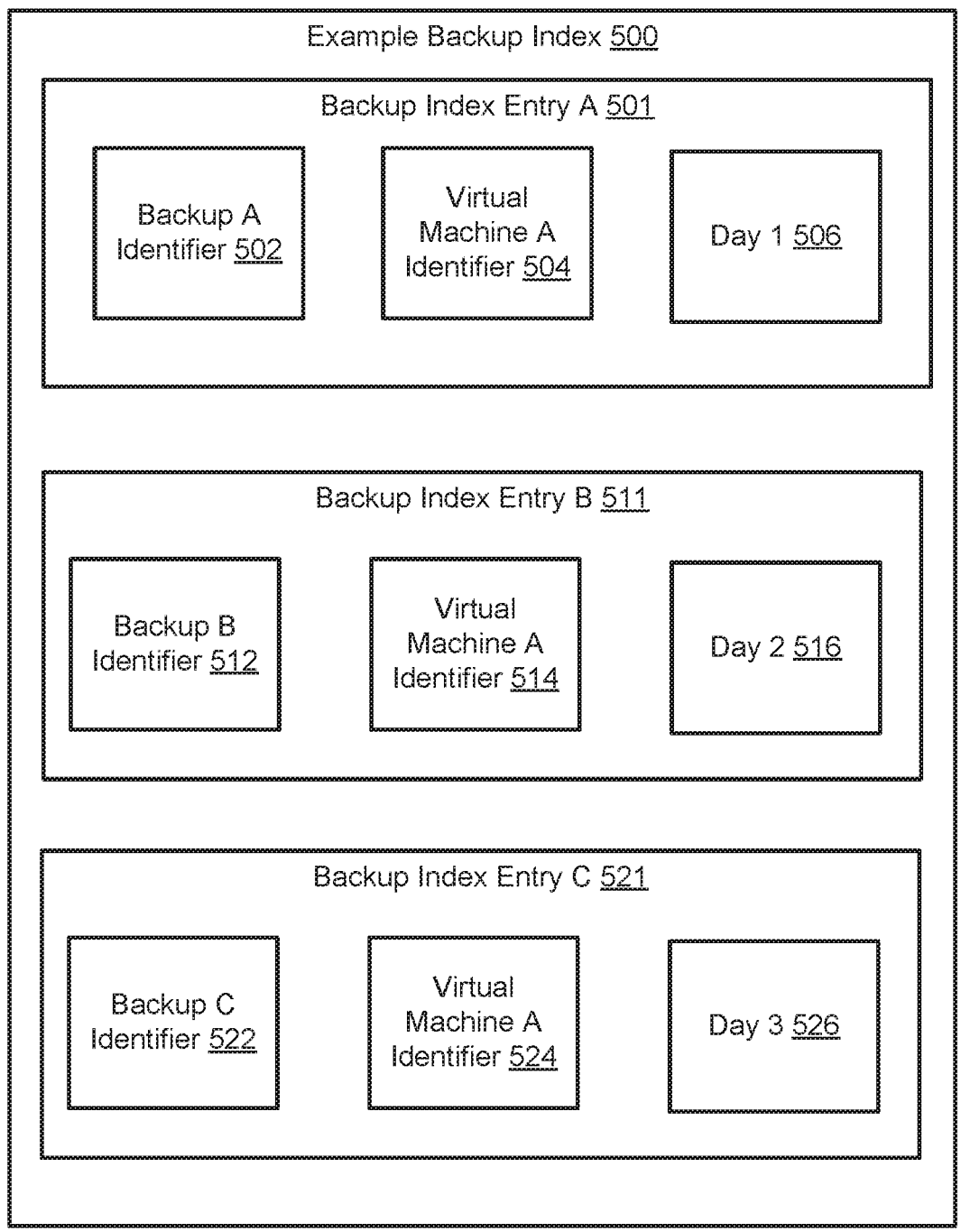
FIG. 5A shows a diagram of an example backup index.
Figures 5B, 5C:
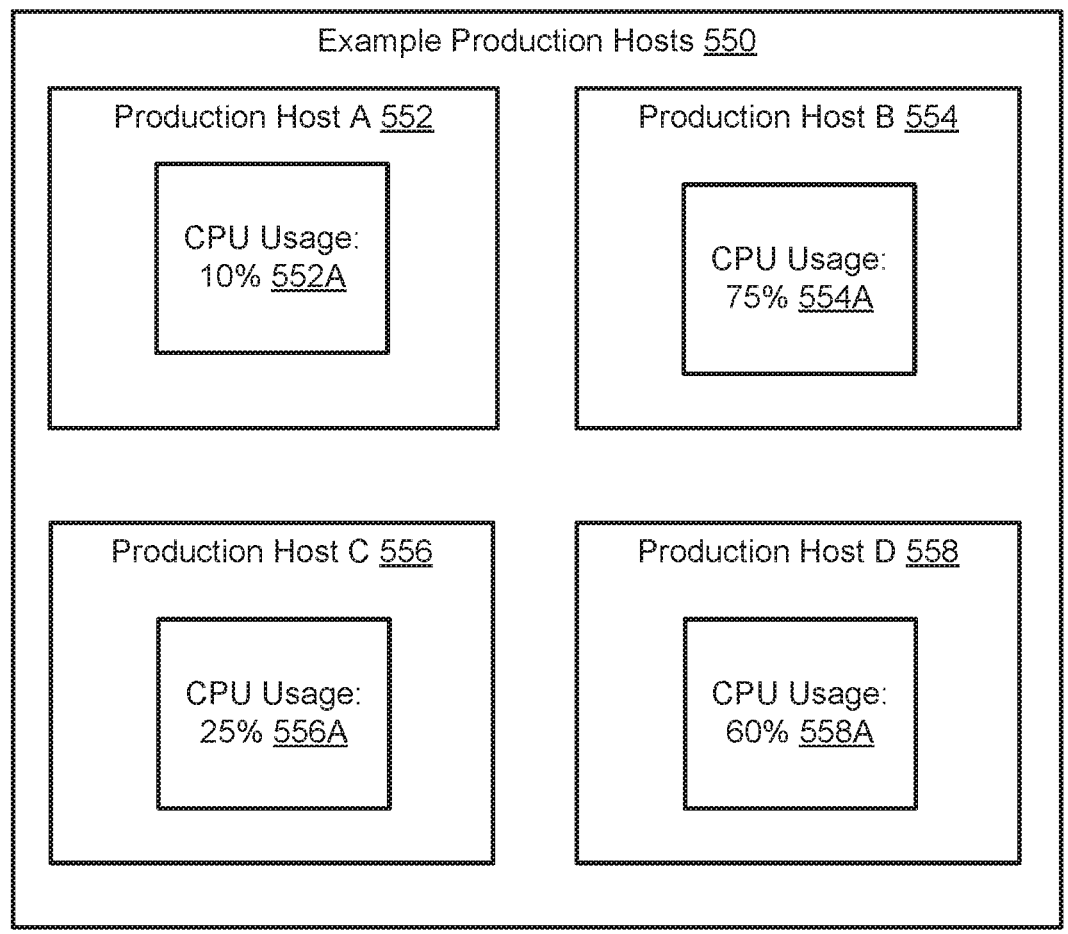
FIG. 5B shows a diagram of example production hosts.
FIG. 5C shows a diagram of an example list.

To further clarify embodiments of the invention, a non-limiting example is provided in FIGS. 5A-5C. The example illustrated in FIGS. 5A-5C may be performed by a system similar to that of FIG. 1 but for the sake of brevity only a portion of the components are illustrated.

Example

Consider a scenario in which an example backup index (500) includes data reflective of three backups in backup storage as illustrated in FIG. 5A. The example backup index (500) may include three entries (501, 511, 521) that reflect backups of a virtual machine generated on days 1-3 (506, 51.6, 526). Each of the entries may include a backup identifier (502, 512, 522), a virtual machine identifier (504, 514, 524), and a time period indicator (506, 516, 526). These backups may be usable for restoration of the virtual machine.

After the backups are generated, a request for restoring the virtual machine is received by a remote agent (not shown). In response, the remote agent performs the methods illustrated in FIGS. 4A-4B. As part of the methods, the remote agent performs a resource availability analysis of production hosts (550) that could be used to perform the restoration as illustrated in FIG. 5B. As seen from FIG. 5B, different production hosts are under different computing resource loads. For example, production host A (552) is under a relatively light load because its CPU usage is at 10% while, in contrast, production host B (554) is under a heavy computing resource load of 75%. The remote agent may identify a restoration load of 50% of CPU usage for performing the restoration. Each CPU usage (552A, 554A, 556A, 558A) may be aggregated to the restoration load to generate a future load estimate for each production host (552, 554, 556, 558). Production host A (552) may have a future load estimate of 60%, production host B (554) may have a future load estimate of 125%, production host C (556) may have a future load estimate of 75%, and production host D (558) may have a future load estimate of 110%.

To prevent the user that sent the restoration request from selecting an over utilized production host (i.e., a future load estimate greater than 100%), the remote agent removes production hosts B (554) and D (558) from the list of production hosts (560) that are usable for restoration purposes as illustrated in FIG. 5C. Consequently, the user is prevented from selecting either of these production hosts for performing the restoration of the virtual machine.

After removal of production hosts B (554) and D (558), the user is presented with the option of performing the restoration using either production host A (552) or production host C (556). Once selected, the remote agent orchestrates the restoration on either of these production hosts as selected by the user.

End of Example

Figure 6:
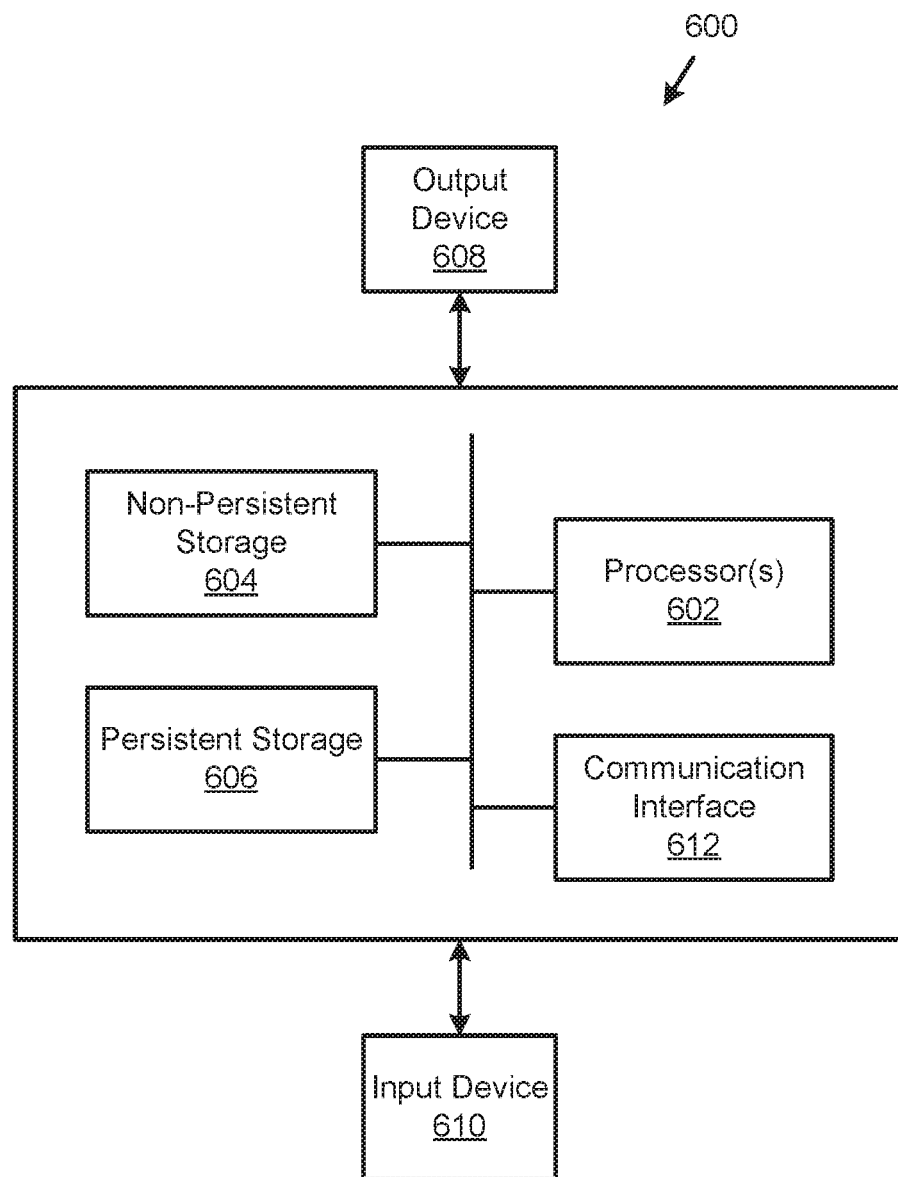
FIG. 6 shows a diagram of a computing device in accordance with one or more embodiments of the invention.

As discussed above, embodiments of the invention may be implemented using computing devices. FIG. 6 shows a diagram of a computing device in accordance with one or more embodiments of the invention. The computing device (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), input devices (610), output devices (608), and numerous other elements (not shown) and functionalities. Each of these components is described below.

In one embodiment of the invention, the computer processor(s) (602) may be an integrated circuit for processing instructions. For example, the computer processor(s) may be one or more cores or micro-cores of a processor. The computing device (900) may also include one or more input devices (610), such as a touchscreen, keyboard, mouse, microphone, touchpad, electronic pen, or any other type of input device. Further, the communication interface (612) may include an integrated circuit for connecting the computing device (600) to a network (not shown) (e.g., a local area network (LAN), a wide area network (WAN) such as the Internet, mobile network, or any other type of network) and/or to another device, such as another computing device.

In one embodiment of the invention, the computing device (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

Embodiments of the invention may improve the process of performing a restoration in a distributed environment. For example, embodiments of the invention may prevent a restoration from being initiated that will not meet expectations of the user that initiated the restoration, will not be completed due to computing resource or other limitations, or that will negative impact the quality of service being provided to users by a production host that will perform a restoration. Embodiments of the invention may provide these and other advantages by characterizing aspects of a distribute environment. In contrast to a single system that is comparatively deterministic in nature, distributed environments are neither as predictable nor deterministic because of the multitude of separately executing entities that each may change the nature of the distributed environment dynamically. Because of these problems that arrive in a distributed environment, embodiments of the invention may address these problems by characterizing the environment and guiding a user when invoking a restoration process. Otherwise, the cognitive burden placed on a user may become too large and make it nearly impossible for a user to invoke a process for performing a restoration that is likely to meet the user's goal.

Embodiments of the invention may further address the problem of cognitive load on a user. As noted above, due to the dynamic nature of a distributed environment and the number of actors in the distribute environment it is unreasonable expect a user to invoke a restoration process that takes into account both the dynamic nature and multiple actors in the environment. In other words, such environments place an untenable cognitive load on users. Further, as distributed systems expand in scope the already untenable cognitive load placed on users will grow. In contrast, embodiments of the invention reduce a cognitive burden by automatically reducing the number of options presented to a user in a graphical user interface. In this manner, embodiments of the invention directly decrease a cognitive load on the user.

The problems discussed above should be understood as being examples of problems solved by embodiments of the invention disclosed herein and the invention should not be limited to solving the same/similar problems. The disclosed invention is broadly applicable to address a range of problems beyond those discussed herein.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A remote agent for managing virtual machines, comprising:
   a persistent storage that stores backup/restoration policies;
   a graphical user interface manager; and
   a restoration manager programmed to:
   obtain a restoration request via a first pane of a graphical user interface generated by the graphical user interface manager, wherein the restoration request is for a virtual machine of the virtual machines, wherein the virtual machines are hosted by production hosts;
   in response to obtaining the restoration request:
   predict a restoration load for performing a restoration of the virtual machine, wherein the restoration load is based on a number of backups and on a size of each of the number of backups;

perform a resource availability analysis of the production hosts using the restoration load to obtain a list of production hosts for performing a restoration of the virtual machine;

make a first determination that the list specifies at least one production host of the production hosts; and in response to the first determination:

modify a second pane of the graphical user interface based on the list to obtain a modified second pane;

obtain a user selection of a restoration option displayed in the modified second pane; and restore the virtual machine using the restoration option and the backup/restoration policies, wherein performing the resource availability analysis of the production hosts comprises:

identifying a non-restoration load for each of the production hosts, wherein the non-restoration load is identified by at least one of: tracking an amount of data stored in each of the production hosts, tracking an average amount of computing processing performed by each of the production hosts during a predetermined period of time, and tracking memory usage of each of the production hosts during the predetermined period of time;

generating future load estimates for the production hosts based on both of the restoration load and each respective non-restoration load;

identifying a portion of the production hosts that each have more computing resources than a future load estimate of the future load estimates associated with each respective production host; and populating the list with the identified portion of the production hosts.

2. The remote agent of claim 1, wherein the restoration manager is further programmed to:

obtain a second restoration request for a second virtual machine of the virtual machines;

in response to obtaining the second restoration request:

predict a second restoration load for performing a restoration of the second virtual machine;

perform a second resource availability analysis of the production hosts using the second restoration load to obtain a second list of production hosts for performing a second restoration of the second virtual machine;

make a second determination that the list does not specify any of the production hosts;

in response to the second determination:

disable the modified second pane of the graphic user interface to prevent the second restoration from being performed.

3. The remote agent of claim 1, wherein modifying the second pane of the graphical user interface based on the list comprises:

identifying a plurality of restoration options available for performing the restoration;

matching a portion of the plurality of restoration options to entries of the list; and disabling each restoration option of the portion of the plurality of restoration options.

4. The remote agent of claim 3, wherein matching the portion of the plurality of restoration options to the entries of the list comprises:

identifying production hosts implicated by the plurality of restoration options, and matching identifiers of the production hosts implicated by the plurality of restoration options to the entries of the list, wherein each entry of the list comprises an identifier of a production host of the production hosts.

5. The remote agent of claim 1, wherein the first pane of the graphic user interface is displayed before the modified second pane of the graphic user interface is displayed, wherein the graphic user interface is displayed to a user.

6. The remote agent of claim 1, wherein restoring the virtual machine using the restoration option and the backup/restoration policies comprises:

matching the restoration option to a restoration policy of the backup/restoration policies; and performing a restoration workflow specified by the restoration policy.

7. The remote agent of claim 6, wherein performing the restoration workflow instantiates a copy of the virtual machine in a production host specified by the list.

8. The remote agent of claim 6, wherein performing the restoration workflow comprises obtaining backups from a backup storage, wherein the backups are based on a backup policy of the backup/restoration policies.

9. The remote agent of claim 8, wherein the backup storage is separate from the production hosts, wherein the remote agent is separate from the backup storage, wherein the remote agent is separate from the production hosts.

10. The remote agent of claim 1, wherein obtaining the restoration request via the first pane of the graphical user interface generated by the graphical user interface manager comprises:

obtaining a second user selection of the virtual machine; and obtaining a third user selection of a time for performing the restoration.

11. A method for managing virtual machines, comprising:

obtaining a restoration request via a first pane of a graphical user interface generated by a graphical user interface manager, wherein the restoration request is for a virtual machine of the virtual machines, wherein the virtual machines are hosted by production hosts;

in response to obtaining the restoration request:

predicting a restoration load for performing a restoration of the virtual machine, wherein the restoration load is based on a number of backups and on a size of each of the number of backups;

performing a resource availability analysis of the production hosts using the restoration load to obtain a list of production hosts for performing a restoration of the virtual machine;

making a first determination that the list specifies at least one production host of the production hosts; and in response to the first determination:

modifying a second pane of the graphical user interface based on the list to obtain a modified second pane;

obtaining a user selection of a restoration option displayed in the modified second pane; and restoring the virtual machine using the restoration option and backup/restoration policies, wherein performing the resource availability analysis of the production hosts comprises:
  identifying a non-restoration load for each of the production hosts, wherein a non-restoration load is identified by at least one of: tracking an amount of data stored in each of the production hosts, tracking an average amount of computing processing performed by each of the production hosts during a predetermined period of time, and tracking memory usage of each of the production hosts during the predetermined period of time;
  generating future load estimates for the production hosts based on both of the restoration load and each respective non-restoration load;
  identifying a portion of the production hosts that each have more computing resources than a future load estimate of the future load estimates associated with each respective production host and populating the list with the identified portion of the production hosts.

12. The method of claim 11, wherein the method further comprises:
  obtaining a second restoration request for a second virtual machine of the virtual machines;
  in response to obtaining the second restoration request:
    predicting a second restoration load for performing a restoration of the second virtual machine;
    performing a second resource availability analysis of the production hosts using the second restoration load to obtain a second list of production hosts for performing a second restoration of the second virtual machine;
    making a second determination that the list does not specify any of the production hosts;
    in response to the second determination:
      disabling the modified second pane of the graphic user interface to prevent the second restoration from being performed.

13. The method of claim 11, wherein modifying the second pane of the graphical user interface based on the list comprises:
  identifying a plurality of restoration options available for performing the restoration;
  matching a portion of the plurality of restoration options to entries of the list; and
  disabling each restoration option of the portion of the plurality of restoration options.

14. A non-transitory computer readable medium comprising computer readable program code, which when executed by a computer processor enables the computer processor to perform a method for managing virtual machines, the method comprising:
  obtaining a restoration request via a first pane of a graphical user interface generated by a graphical user interface manager, wherein the restoration request is for a virtual machine of the virtual machines, wherein the virtual machines are hosted by production hosts;
  in response to obtaining the restoration request:
    predicting a restoration load for performing a restoration of the virtual machine;
    performing a resource availability analysis of the production hosts using the restoration load to obtain a list of production hosts for performing a restoration of the virtual machine;
    making a first determination that the list specifies at least one production host of the production hosts; and
    in response to the first determination:
      modifying a second pane of the graphical user interface based on the list to obtain a modified second pane;
      obtaining a user selection of a restoration option displayed in the modified second pane; and
      restoring the virtual machine using the restoration option and backup/restoration policies,
  wherein performing the resource availability analysis of the production hosts comprises:
    identifying a non-restoration load for each of the production hosts, wherein a non-restoration load is identified by at least one of: tracking an amount of data stored in each of the production hosts, tracking an average amount of computing processing performed by each of the production hosts during a predetermined period of time, and tracking memory usage of each of the production hosts during the predetermined period of time;
    generating future load estimates for the production hosts based on both of the restoration load and each respective non-restoration load;
    identifying a portion of the production hosts that each have more computing resources than a future load estimate of the future load estimates associated with each respective production host and populating the list with the identified portion of the production hosts.

15. The non-transitory computer readable medium of claim 14, wherein the method further comprises:
  obtaining a second restoration request for a second virtual machine of the virtual machines;
  in response to obtaining the second restoration request:
    predicting a second restoration load for performing a restoration of the second virtual machine;
    performing a second resource availability analysis of the production hosts using the second restoration load to obtain a second list of production hosts for performing a second restoration of the second virtual machine;
    making a second determination that the list does not specify any of the production hosts;
    in response to the second determination:
      disabling the modified second pane of the graphic user interface to prevent the second restoration from being performed.

16. The non-transitory computer readable medium of claim 14, wherein modifying the second pane of the graphical user interface based on the list comprises:
  identifying a plurality of restoration options available for performing the restoration;
  matching a portion of the plurality of restoration options to entries of the list; and
  disabling each restoration option of the portion of the plurality of restoration options.

* * * * *